United States Patent
Guerra Castillo et al.

(10) Patent No.: US 11,901,724 B1
(45) Date of Patent: Feb. 13, 2024

(54) METHOD AND APPARATUS TO OPTIMIZE PROTECTION OF FUSE-PROTECTED TRANSFORMERS AND AF MITIGATION

(71) Applicant: SAUDI ARABIAN OIL COMPANY, Dhahran (SA)

(72) Inventors: Ricardo Jose Guerra Castillo, Madrid (ES); Faisal Almansour, Alkhobar (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/052,466

(22) Filed: Nov. 3, 2022

(51) Int. Cl.
*H02H 7/04* (2006.01)

(52) U.S. Cl.
CPC .................................... *H02H 7/04* (2013.01)

(58) Field of Classification Search
CPC ................................ H02H 7/04; H02H 1/043
See application file for complete search history.

(56) References Cited

U.S. PATENT DOCUMENTS

| 9,240,682 B2 | 1/2016 | Sivakumar et al. |
| 2010/0194380 A1* | 8/2010 | Cooper ................. G01R 15/181 324/101 |
| 2015/0092311 A1* | 4/2015 | Wang ....................... H02H 3/08 361/86 |
| 2022/0271527 A1* | 8/2022 | Bishop .................. H01F 27/402 |

FOREIGN PATENT DOCUMENTS

| CN | 203747397 U | 7/2014 |
| GB | 2450534 A | 12/2008 |
| JP | S5637566 A | 4/1981 |

* cited by examiner

*Primary Examiner* — Scott Bauer
(74) *Attorney, Agent, or Firm* — Vorys, Sater, Seymour and Pease LLP

(57) ABSTRACT

In one embodiment, a system for protecting an electrical component includes an overload fuse, and a diverter switch connected in parallel with the overload fuse and operable in a first closed position to provide an electrical path for inrush current when the system is energized and in a second open position to direct operating current exclusively through the overload fuse when the system is in normal operating condition.

20 Claims, 5 Drawing Sheets

METHOD AND APPARATUS TO OPTIMIZE PROTECTION OF FUSE-PROTECTED TRANSFORMERS AND AF MITIGATION

FIELD OF THE DISCLOSURE

The present disclosure relates generally to fuse protection in electrical power distribution systems.

BACKGROUND OF THE DISCLOSURE

Distribution transformers, pad mounted transformers and OHL (overhead line) tapping transformers (pole mounted) protected by fuses may not be fully protected because their complete damage curve is not being covered by the protecting fuse operating curve. The transformer damage curve represents the points at which a transformer can suffer thermal or mechanical damage as a result of the electrical current flowing through its windings. Ideally, the curve of protective devices utilized to protect electrical machines such as a transformer should fall in the lower left side of the transformer damage curve on every single point; however, this is not always possible due to the fact that fuses have "fix type" characteristics and there is always an inrush current which will be the main factor determining the minimum fuse size and curve when the primary machine is protected by fuses. When a distribution or power transformer is initially energized, a short-duration magnetizing-inrush current is drawn from the electrical network so the fuse protective device located at the primary side of the electrical machine must be capable of allowing this high magnetizing current to go through without operating (melting). The magnitude of this inrush current will depend on the residual magnetism in the unit core, the instantaneous value of the voltage waveform at the time the breaker is closed, the ferromagnetic material and core construction. Due to the uncertainty of these factors, fuses protecting transformers need to be sized to guarantee transformer protection but also to withstand the maximum inrush current flowing in the system during energization processes. Some of the main requirements to be met by the selected fuse is that the minimum melting time characteristic of the primary fuse should be such that the fuse will not operate (i.e., melt) due to the magnetizing-inrush current. IEEE recommends that the fuse curve needs to be above 12 times transformer Full Load Amps (FLA) for 100 ms. Otherwise, the protecting fuse might interrupt the very high inrush current by melting during the transformer energization process, thus compromising power system operations and increasing OPEX (operating expenditures). In addition, in transformers protected by fuses, the complete damage curve is not fully covered by the fuse curve but in some cases just a reduced part of the overload curve and, in most of the cases, the whole short-circuit/mechanical damage. Usually the recommended fuse cannot be used as an arc flash energy mitigation for the low voltage side of the subjected transformers and at the same time might make it difficult to coordinate with upstream protection devices, because, as explained above, recommended fuses have to allow the magnetizing inrush current to flow during the energization process in order to successfully energize the electrical machine.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In one embodiment, a system for protecting an electrical component includes an overload fuse, and a diverter switch connected in parallel with the overload fuse and operable in a first closed position to provide an electrical path for inrush current when the system is initially energized and in a second open position to direct operating current exclusively through the overload fuse.

In a further embodiment, a method for protecting a circuit having a distribution transformer includes establishing a parallel electrical connection between an overload fuse and a diverter switch that are coupled upstream from the distribution transformer, closing the diverter switch in advance of an inrush current, energizing the circuit to thereby pass at least a portion of the inrush current through the closed diverter switch, and opening the diverter switch after the inrush current has passed.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
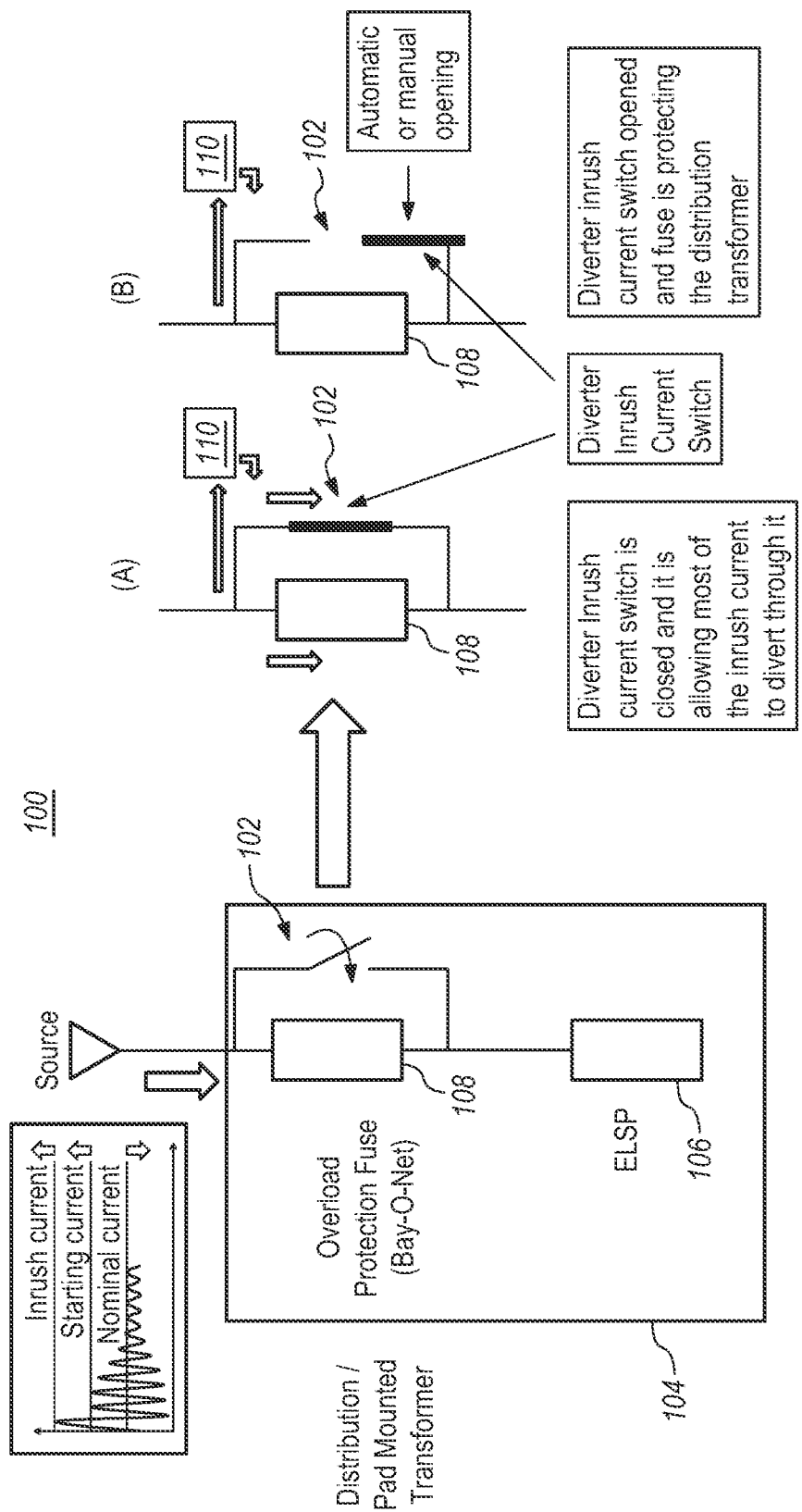
FIG. 1 is a schematic diagram illustrating the use of a diverter switch in a system in accordance with certain embodiments.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

According to an embodiment consistent with the present disclosure,

Embodiments in accordance with the present disclosure relate generally to fuse protection in electrical power distribution systems.

FIG. 1 is a schematic diagram illustrating the use of a diverter switch in a system 100 in accordance with certain embodiments. Diverter switch 102 operates to divert inrush current of an electrical machine, including a downstream-connected pad-mounted distribution-power transformer 104, having an ELSP (Energy Limiting Submersible Partial-range) device 106 (e.g., current-limiting fuse) and protected by an overload fuse 108 (a Bay-O-Net™ fuse for example), so as to help provide better protection, reliable operation and importantly, low arc flash incident energy in the low voltage side (LV) of the subjected machine by eliminating the need for the fuse to pass the inrush current at initial energization, for example starting from an unenergized state. As seen in the schematic diagram of FIG. 1, diverter switch 102 is connected in parallel with the overload fuse 108 and is operable, at A, to divert inrush current flow during the initial energization process to a low impedance electrical path provided by the closed switch.

It should be noted that conventionally, one of the limitations when protecting distribution transformers with fuses is that the fuse's time-current curve needs to be for example at or above 12 times transformer Full Load Amps (FLA) for 100 ms for certain applications; otherwise, the protecting fuse might interrupt this very high current (inrush) by melting during the transformer energization process, thus compromising power system operations and increasing OPEX. In certain embodiments as disclosed herein, however, the diverter switch 102 is utilized, and will be closed (at A in FIG. 1) during the transformer energization process in order to reduce the maximum current flowing through the fuse 108, with some or all of the inrush current flowing through the low impedance path of the closed switch. Once the inrush current has passed through and has been substantially absorbed by the transformer ferromagnetic core, the switch 102 may be opened, manually or automatically, as seen at B in FIG. 1, so that the fuse 108 can operate in the normal protective fashion. In this manner, the proposed arrangement using the diverter switch 102 will reduce the conventional requirement of minimum melting time characteristic of the fuse 108—that is, the requirement that the fuse curve be above the magnetizing inrush current, nominally 12 times transformer FLA for 100 ms for example. The arrangement is thus able to protect against the high magnitude inrush current even while using a lower size/rating overload fuse 108. In certain embodiments, the overload fuse 108 can be selected to be less than 12 times transformer FLA for 100 ms. This arrangement insures that in case of having a fault in the other side of the transformer (i.e., LV side), the fuse will limit the maximum energy released, while the fuse remains connected during normal operation to protect the equipment. For example, the diverter switch can be deployed at 13.8 kV in order to allow a protection engineer or other operational staff to specify any fuse size and curve suitable to guarantee that AF energy level of energy at the LV side is not higher than 12 cal/cm². The fuse can thus be appropriately sized so that in normal operation a smaller fuse can be used to allow for better protection of the equipment and also lower the Arc Flash energy.

Figure 1A:
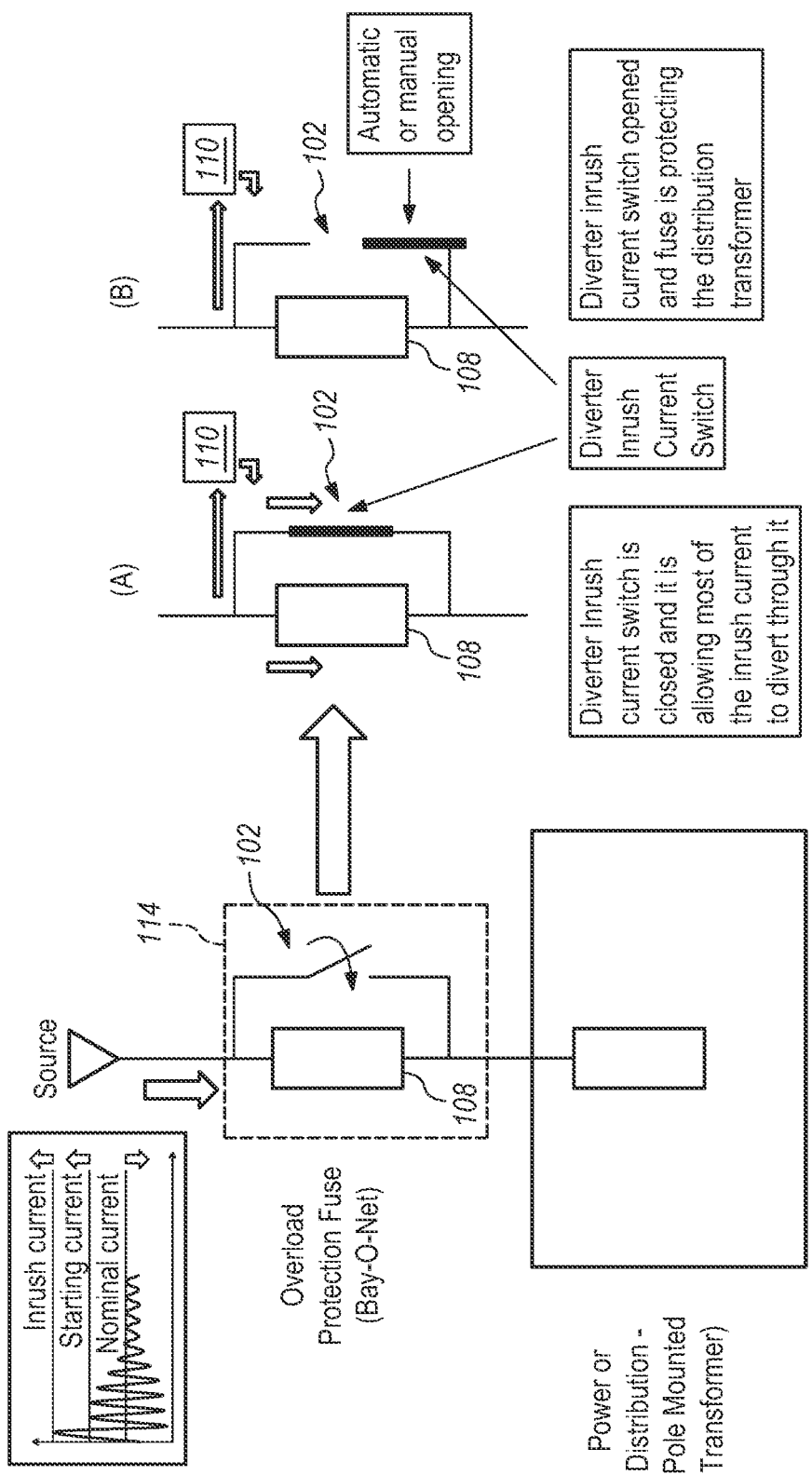
FIG. 1A is a schematic diagram illustrating the use of a diverter switch in a system in accordance with certain embodiments, wherein the machine is a mounted transformer, a distribution or power transformer.

The concept design may vary depending on the application and configuration of the system itself, and can be utilized by transformer manufacturers, fuse holder manufacturers, and power system operators for instance. Thus, in certain embodiments, for example when the machine is a pad-mounted transformer, the switch 102 and fuse 108 can be configured as part of the transformer package as seen in FIG. 1, In certain embodiments, such as when the machine is a pole-mounted transformer, a distribution or power transformer 106a shown in FIG. 1A, the switch 102 and/or the fuse 108 can be separate from the transformer, but can be integrated together into a single package 114. This is illustrated in FIG. 1A. Various combinations of these illustrated groupings and packagings are contemplated.

In certain embodiments, automatic operation of the diverter switch 102 is contemplated. For example, a detection circuit 110 can be used to control operation of the diverter switch 102, opening the switch after sensing the passage of the inrush current. In certain embodiments, the detection circuit 110 can also close the switch 102 in anticipation of the inrush current, by detecting its onset or by way of a mechanical linkage to a system energization switch (not shown) that, when actuated, also actuates the detection circuit to close the switch 102 so that inrush current can be safely passed through the switch.

Figure 2:
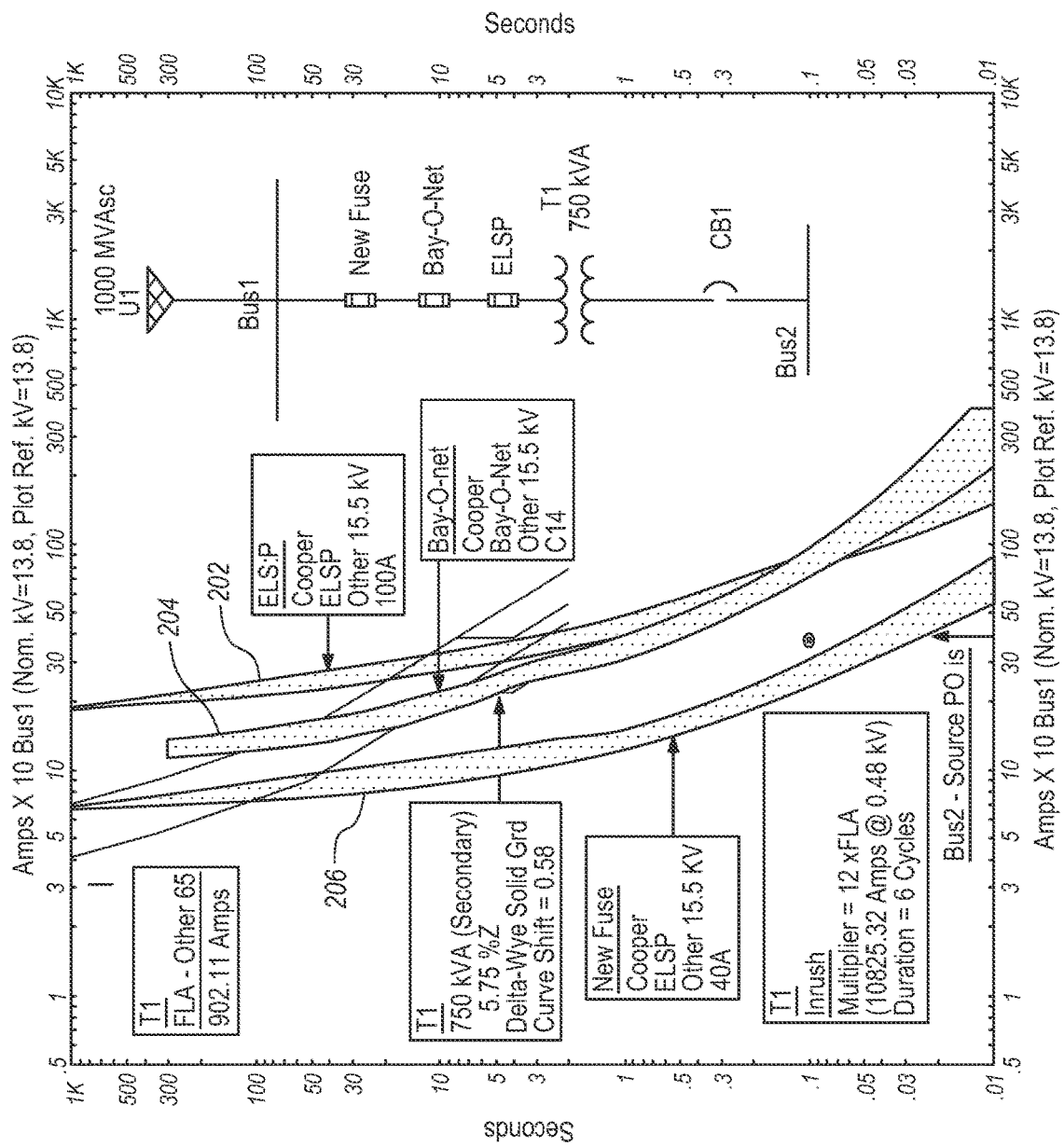
FIG. 2 shows example Time Current Curves of various components described herein.

FIG. 2 shows Time Current Curves (TCC) in which curve 202 corresponds to the ELSP and curve 204 corresponds to a Bay-O-Net™ fuse conventionally used for protection following the IEEE recommendation. Curve 206, on the other hand, corresponds to a fuse 108 with reduced ratings that may be used with the diverter switch 102 in the arrangement of FIG. 1. The actual components and values shown in the figure are illustrative only and others are contemplated in lieu thereof.

Figure 3:
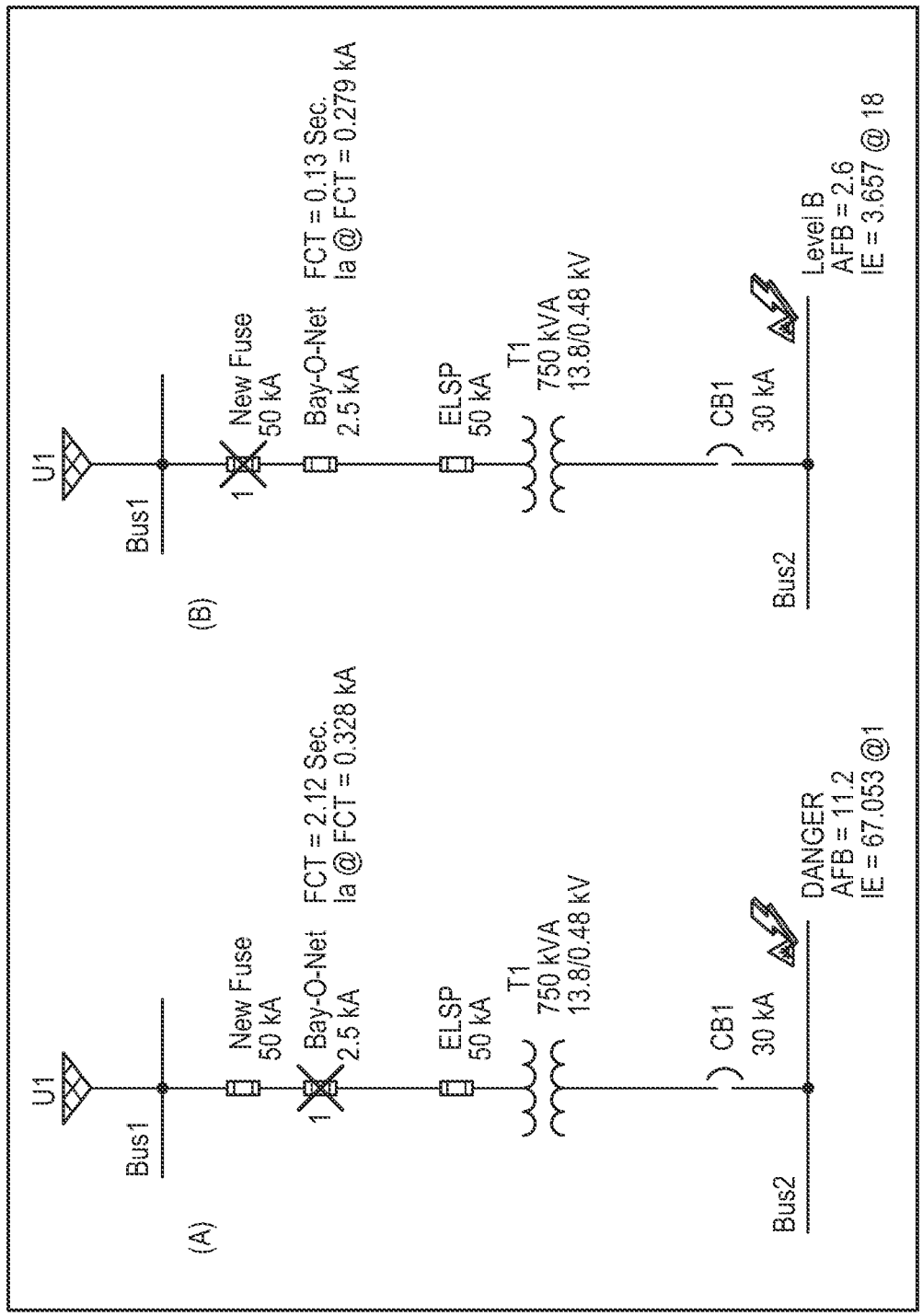
FIG. 3 is a schematic diagram showing a comparison between the AF incident energy resultant from a conventional arrangement (A) and an arrangement in accordance with certain embodiments (B).

FIG. 3 is a schematic diagram showing a comparison between the AF incident energy resultant from a conventional arrangement (A) and an arrangement as disclosed herein (B). In the B arrangement the Arc Flash Boundary (AFB) is 2.6 m with the Arc Flash Incident Energy IE of 3.657 @18 is significantly safer. In the arrangement at (A) the fault is classified as Danger (>40 cal/cm2), which means that there are no PPE (personal protective equipment) that can guarantee operator safety while performing an electrical task. In the arrangement at (B), the same fault is classified as Level B (<12 Cal/cm2) which means the minimum PPE requirement to be worn by any worker performing maintenance or switching will be enough to guarantee safety of people within the Arc Flash boundary.

Figure 4:
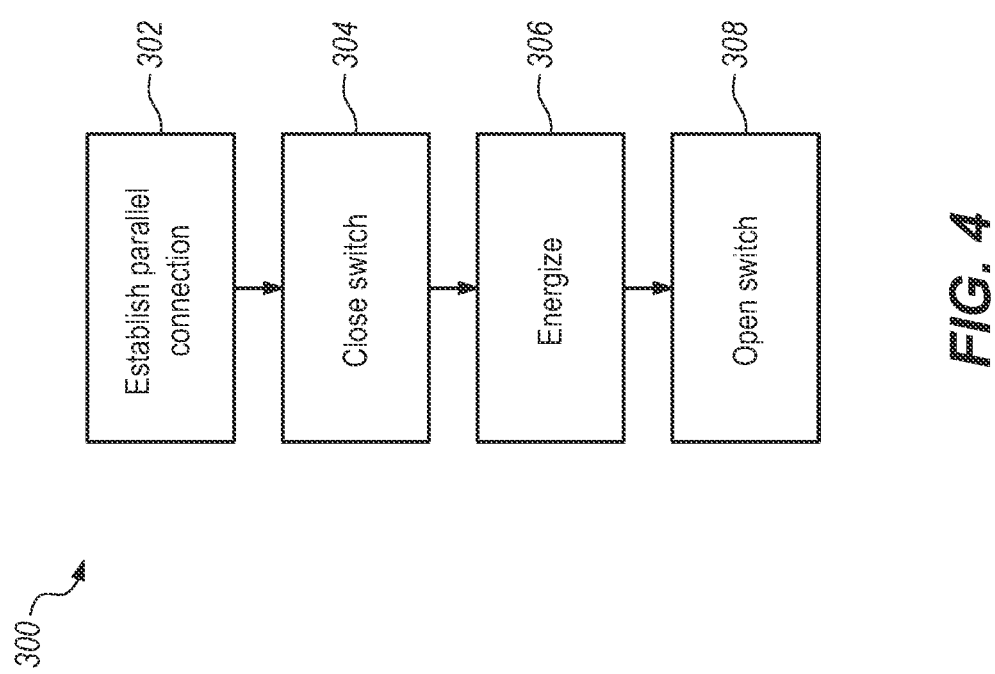
FIG. 4 is a flow diagram of a method for operating a system for protecting a component such as pad-mounted transformer in accordance with certain embodiments

FIG. 4 is a flow diagram of a method 300 for operating a system for protecting a component such as pad-mounted transformer 104 (FIG. 1) in accordance with certain embodiments. At 302, a diverter switch, for example diverter switch 102 (FIG. 1), is connected in parallel across an overload fuse such as fuse 108. At 304, switch 102 is closed. At 306, the system is initially energized, for example from an unenergized state, causing inrush current to flow at least partially through the fuse 108 and partially through the low impedance path of the closed switch 102. In certain embodiments, a portion of the inrush current flows through the switch 102 and a portion flows through the fuse 108. After the inrush current is passed, at 308, the switch 102 is opened, thereby directing system operating current exclusively through the fuse 108 so that the fuse assumes its protective role as the sole current flow path in the system during the system normal operating condition.

Embodiments disclosed herein include:

A. A system for protecting an electrical component comprising an overload fuse, and a diverter switch connected in parallel with the overload fuse and operable in a first closed position to provide an electrical path for inrush current when the system is energized and in a second open position to direct operating current exclusively through the overload fuse when the system is in normal operating condition.

B. A method for protecting a circuit having a distribution or power transformer includes establishing a parallel electrical connection between an overload fuse and a diverter switch that can be coupled upstream from the electrical machine or inside the transformer, closing the diverter switch in advance of an inrush current, energizing the circuit to thereby pass at least a portion of the inrush current through the closed diverter switch, and opening the diverter switch after the inrush current has passed Each of embodiments A through B may have one or more of the following additional elements in any combination: Element 1: in the first closed position of the diverter switch, a portion of the inrush current flows through the overload fuse. Element 2: a detection circuit configured to automatically open the diverter switch following passage of the inrush current. Element 3: a detection circuit configured to automatically close the diverter switch in anticipation of the inrush current. Element 4: a detection circuit mechanically linked to a system energization switch. Element 5: the overload fuse is selected to be less than 12 times transformer FLA for 100 ms. Element 6: a pad-mounted transformer connected downstream of the overload fuse. Element 7: the distribution-power transformer is a pad-mounted transformer that is integrated with the fuse and diverter switch in a single package. Element 8: the overload switch and the diverter switch are integrated into a single package.

By way of non-limiting example, exemplary combinations applicable to A through B include: Element 1 with any of Elements 2 through 8; Element 2 with any of Elements 3 through 8; Element 3 with any of Elements 4 though 8; Element 4 with any of Elements 5 through 8; Element with any of Elements 6 through 8; Element 6 with any of Elements 7 through 8; and Element 7 with Element 8. Any one or more of Elements 1 through 8 with any one or more other of Elements of 1 through 8.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system for protecting a transformer in an AC electrical network, the system comprising:
   an overload fuse coupled to a primary winding of the transformer in an AC current path of the electrical network, the overload fuse rated to reduce arc flash energy at a low voltage (LV) side of the transformer; and
   a diverter switch connected in parallel with the overload fuse and operable in a first closed position to provide an electrical path for inrush current when the system is energized and in a second, normally open position to direct operating current exclusively through the overload fuse when the system is in normal operating condition.

2. The system of claim 1, wherein in the first closed position of the diverter switch, a portion of the inrush current flows through the overload fuse.

3. The system of claim 1, further comprising a detection circuit configured to automatically open the diverter switch following passage of the inrush current.

4. The system of claim 1, further comprising a detection circuit configured to automatically close the diverter switch in anticipation of the inrush current.

5. The system of claim 4, wherein the detection circuit is mechanically linked to a system energization switch.

6. The system of claim 1, wherein the overload fuse is selected so that its time-current curve is less than 12 times transformer Full Load Amps for 100 ms.

7. The system of claim 1, further comprising a distribution-power transformer connected downstream of the overload fuse.

8. The system of claim 7, wherein the distribution-power transformer is a pad-mounted transformer that is integrated with the fuse and diverter switch in a single package.

9. The system of claim 1, wherein the overload fuse and the diverter switch are integrated into a single package.

10. The system of claim 1, wherein the overload fuse is coupled to the primary winding of the transformer in a direct AC current path of the electrical network that does not include a circuit breaker or electronic interrupting device.

11. A method for protecting a circuit including a transformer comprising:
   coupling an overload fuse to a primary winding of the transformer in an AC current path of the circuit, the overload fuse rated to reduce arc flash energy at a low voltage (LV) side of the transformer;

establishing a parallel electrical connection between the overload fuse and a diverter switch that are coupled upstream from the transformer;

closing the diverter switch in advance of an inrush current;

energizing the circuit to thereby pass at least a portion of the inrush current through the closed diverter switch; and opening the diverter switch after the inrush current has passed.

12. The method of claim 11, further comprising passing at least a portion of the inrush current through the closed diverter switch.

13. The method of claim 11, further comprising detecting the presence of the inrush current and automatically closing the diverter switch based on said detecting.

14. The method of claim 11, further comprising automatically opening the diverter switch after passage of the inrush current.

15. The method of claim 14, wherein the automatically opening is mechanically linked to a system energizing switch.

16. The method of claim 11, wherein the overload fuse is selected so that its time-current curve is less than 12 times transformer Full Load Amps for 100 ms.

17. The method of claim 11, wherein the transformer is a pad-mounted transformer.

18. The method of claim 17, wherein the pad-mounted transformer and the diverter switch are integrated into a single package.

19. The method of claim 11, wherein the overload fuse and the diverter switch are integrated into a single package.

20. The method of claim 11, wherein overload fuse is coupled to the primary winding of the transformer in a direct AC current path of the electrical network that does not include a circuit breaker or electronic interrupting device.

* * * * *